United States Patent [19]
Young et al.

[11] 3,776,488
[45] Dec. 4, 1973

[54] TAPE APPARATUS

[75] Inventors: Alan M. Young; Edwin Y. Webb, both of Los Gatos, Calif.

[73] Assignee: Dicon Industries, Sunnyvale, Calif.

[22] Filed: May 10, 1971

[21] Appl. No.: 141,661

Related U.S. Application Data

[63] Continuation-in-part of Ser. No. 56,431, July 20, 1970.

[52] U.S. Cl. .................................... 242/183, 226/97
[51] Int. Cl.. G11b 15/06, G11b 15/58, G11b 23/12
[58] Field of Search ........................ 242/182–185; 274/4 D, 11 D; 226/95, 97, 118

[56] References Cited

UNITED STATES PATENTS

| | | | |
|---|---|---|---|
| 3,643,889 | 2/1972 | Krause | 242/182 |
| 2,941,741 | 6/1960 | Bilsback | 242/198 |
| 3,206,132 | 9/1965 | Libby | 242/183 |
| 3,229,927 | 1/1966 | Cohler | 242/184 |
| 3,499,614 | 3/1970 | Badum | 242/182 |

*Primary Examiner*—Leonard D. Christian
*Attorney*—Flehr, Hohbach, Test, Albritton & Herbert

[57] ABSTRACT

Tape apparatus adapted to operate with tape extending between tape reels which may be disposed in a cartridge or cassette. The apparatus includes a separate reel drive for driving each tape reel in either direction to supply or take up tape, a vacuum chamber adapted to receive a portion of the tape extending between the reels to form and support a low inertia tape loop, a capstan for driving the tape, and a transducer for recording and reproducing the information or date on the tape. The capstan and transducer are mounted along the wall of said chamber so that the tape loop extends past and has a portion on each side of the transducer and capstan whereby the tape can be rapidly moved in either direction past the transducer by the capstan. The apparatus also includes sensing means which sense the length of the tape loop on each side of the drive capstan and independently control the reel drives to supply and take up tape as the loops are lengthened and shortened as the drive capstan moves tape past the transducer in either direction and means for sensing the ends of the tape.

19 Claims, 11 Drawing Figures

ALAN M. YOUNG
EDWIN Y. WEBB
INVENTORS

BY Flehr, Hohbach, Test, Albritton and Herbert
ATTORNEYS

ALAN M. YOUNG
EDWIN Y. WEBB
INVENTORS

BY Flehr, Hohbach, Test, Albritton and Herbert
ATTORNEYS

ALAN M. YOUNG
EDWIN Y. WEBB
INVENTORS

BY Flehr, Hohbach, Test, Albritton and Herbert
ATTORNEYS

ALAN M. YOUNG
EDWIN Y. WEBB
INVENTORS

BY Flehr, Hohbach, Test, Albritton and Herbert
ATTORNEYS

TAPE APPARATUS

CROSS-REFERENCE TO RELATED APPLICATION

This application is a continuation-in-part of patent application Ser. No. 56,431, filed July 20, 1970, entitled "Cassette Tape Apparatus and Method."

BACKGROUND OF THE INVENTION

This invention relates generally to a magnetic tape apparatus and more particularly to a magnetic tape apparatus adapted to operate on tape extending between tape reels and suitable for recording and reproducing information and digital data.

In connection with computer, digital and other data systems, it is necessary to record and store analog or digital signals and thereafter reproduce the signals. The apparatus must be capable of moving the storage medium, tape, past the transducer at rapid speeds. Furthermore, the apparatus must be capable of rapidly accelerating and decelerating the tape. In general, the tape storage reels have a relatively high inertia and it is difficult to achieve high acceleration and deceleration and high speeds.

It has been customary to provide loops of tape on either side of the transducer and capstan. In some apparatus the loops are engaged by a movable tension arm. Thus, the low inertia tape in the loop can be rapidly accelerated taking up the tape in the supply loop and feeding it into the take-up loop. The tension arms move to maintain substantially constant tension. As the arms are moved, they control reel drives which act to supply and take up the tape on the loops. However, the reels have relatively high inertia and the loops act to permit the reels to come up to speed.

Another approach has been to provide tape storage chambers or bins which accommodate the loops. An unsupported length of tape extends between the two bins and is adapted to be engaged by the drive capstan to rapidly move the tape in either direction past the transducer. Sensing means are provided within the chamber for controlling the loop length in the chamber whereby as the loop length changes, the appropriate reel is driven to supply or take up the tape to maintain a substantially constant loop in each chamber.

In present day cassette and cartridge apparatus no provision is made for withdrawal of the tape from the cassette or cartridge to provide a low inertia external tape loop. Consequently, present day cassette and cartridge apparatus is severely limited in its ability to rapidly accelerate and decelerate tape.

OBJECTS AND SUMMARY OF THE INVENTION

It is a general object of the present invention to provide a tape apparatus and method useful in high speed information and digital data storage and retrieval.

It is another object of the present invention to provide a cartridge or cassette tape apparatus which forms a tape loop extending out of the cartridge or cassette on either side of a transducer and capstan whereby the tape can be rapidly accelerated and decelerated to provide high speed digital information storage and retrieval.

It is another object of the present invention to provide a magnetic tape apparatus in which the tape extends into storage bins disposed on either side of a capstan and transducer disposed along the walls of the bins whereby to provide low inertia tape loops on each side of the capstan for rapid acceleration and deceleration.

It is a further object of the present invention to provide apparatus of the foregoing character in which the tape is automatically withdrawn from the cartridge or cassette and supplied to the storage bins or automatically returned.

It is another object of the invention to provide cassette tape apparatus of the above character which includes means for continuously purging the cartridge or cassette when it is installed and operating in the apparatus.

It is another object of the present invention to provide tape apparatus of the above type in which the storage bin walls are inclined to move the tape against the top or bottom of the bins to thereby accurately guide the tape.

The foregoing and other objects of the invention are achieved by an apparatus which includes means for receiving magnetic tape reels and independently driving the tape reels to present a portion of the tape extending between the reels to a storage bin adapted to receive the tape and form tape loops lying along the side walls of the bin. A capstan and transducer cooperate with the tape lying along the wall of the storage bin whereby the tape is supported by the walls of the bin and can be rapidly moved by the capstan with respect to the transducer to store or retrieve information on the tape. Means also serve to sense the length of the tape loops and control the drive means to supply and take up the tape as the loops are shortened and lengthened responsive to the movement of tape by the capstan. Means are also included for sensing the ends of the tape and providing a warning signal.

DESCRIPTION OF THE PREFERRED EMBODIMENT

Figure 1:
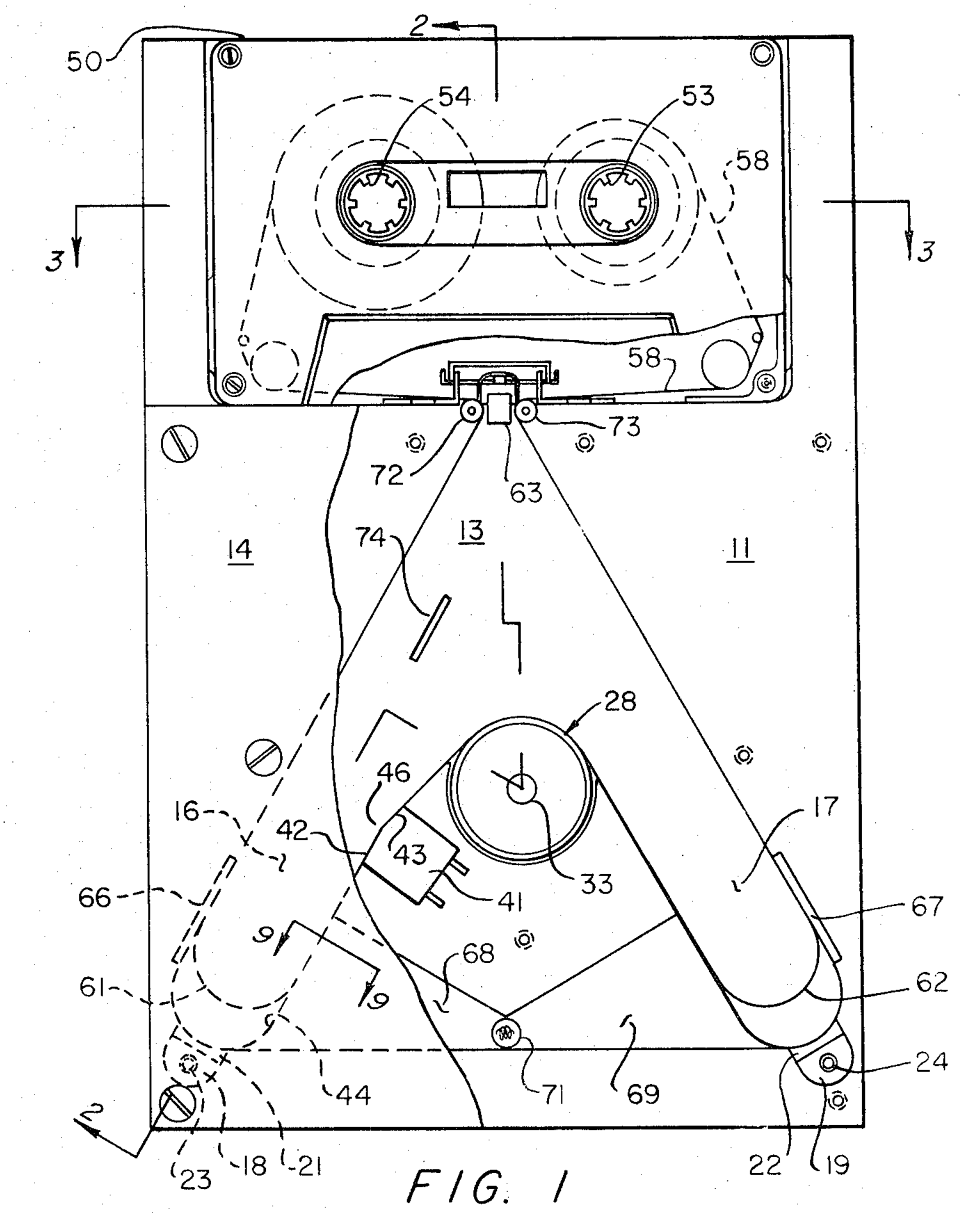
FIG. 1 is a plan view of tape apparatus in accordance with the invention used with a cassette.
Figure 3:
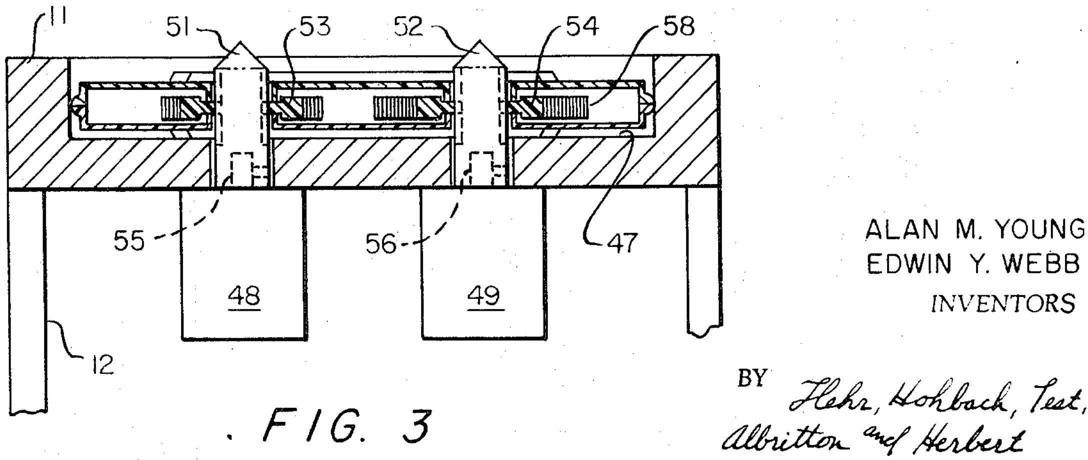
FIG. 3 is a sectional view taken along the line 3—3 of FIG. 1.
Figure 2:
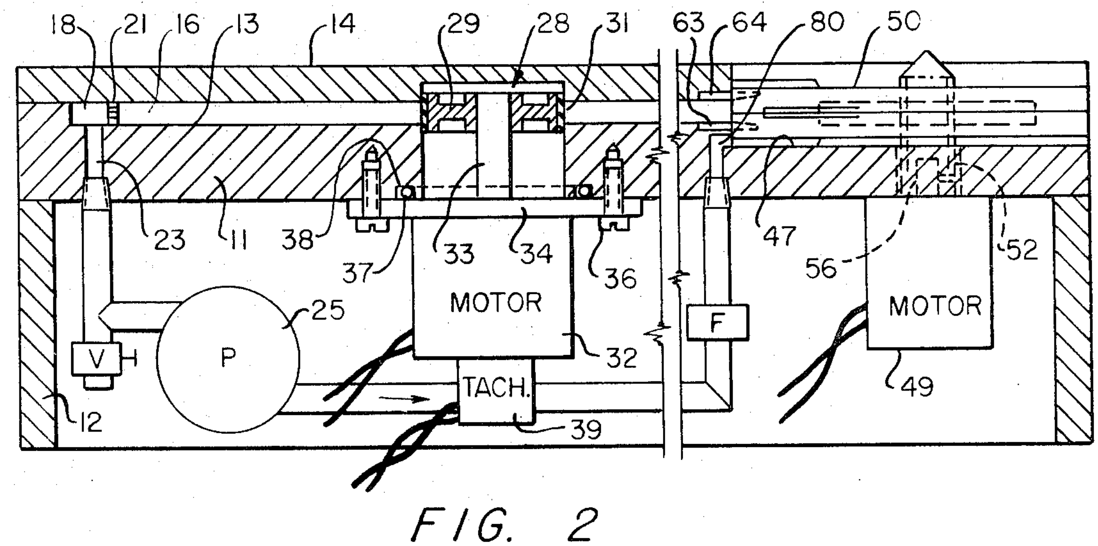
FIG. 2 is a sectional view taken along the line 2—2 of FIG. 1.

Referring to FIGS. 1-3, the apparatus includes a base plate 11 suitably supported as by legs 12. The base plate is machined to define a Y-shaped cavity 13. A top plate 14 is disposed on the upper face of base plate 11 and cooperates with the cavity to define a tape storage bin or chamber. Means are provided to independently apply a vacuum to the arms 16 and 17 of the storage bin. The means shown includes manifolds 18 and 19 which communicate with the respective chambers 16 and 17 through a plurality of slots 21 and 22, respectively, formed at the bottom of the chamber. The slots minimize damage to the tape if it extends to the bottom of the chambers. Passages 23 and 24 formed in the base plate 11 provide means for connecting the manifolds 18 and 19 to a vacuum pump 25 (FIG. 2). Thus, there are formed two chambers with a means for applying a vacuum at the bottom of each of the chambers.

Drive capstan 28 is disposed on the wall of the bin at the juncture of the chambers 16 and 17. The drive capstan comprises a pulley 29 covered with a neoprene sleeve 31. Pulley 29 is driven by motor 32 via motor shaft 33. Motor 32 is carried by mounting plate 34. The mounting plate may be suitably secured to the base plate as, for example, by means of screws 36 and is in sealing engagement with the base plate by means of O-ring 37 disposed in groove 38. A tachometer 39 is connected to be driven by the motor and provides an output voltage which is proportional to the speed of rotation of the capstan.

As is more clearly seen in FIG. 1, a portion of the drive capstan forms a wall of each of the storage chambers. A transducer 41 is mounted in a pocket formed in the base plate and has its front surface 42 lying coextensive with the side wall while its surface 43 inclines away fron the side wall whereby the portion of the tape extending along the wall 44 of the chamber 16 is in cooperative relationship with the transducer tip 46.

The base plate extends outwardly and is adapted to receive a cassette 50 having a pair of tape reels. To accommodate the cassette, the base plate is recessed as shown at 47 to form a cavity which accommodates and locates the cassette in the apparatus. As will be presently described, the apparatus can accommodate tape cartridges of other types, or individual tape reels. As used herein, cartridge shall include all types of cartridges which house a pair of spaced tape reels including so-called cassettes.

A pair of reel motors 48 and 49 are mounted on the base plate and are coupled to reel drives 51 and 52 which extend upwardly into the cavity and are adapted to engage the reel hubs 53 and 54 to drive the reels in either direction responsive to energization of the motors 48 and 49. Referring more particularly to FIGS. 2 and 3, the motor 48 includes a shaft 55 which is splined or pinned to the associated reel drive 51. The motor 49 includes a shaft 56 which is splined or pinned to the associated reel drive 52. Thus, it is seen that the reel hubs are driven by motors 48 and 49 which may drive the reels independently in either direction.

Referring to FIG. 1, the tape 58 is disposed on tape reels associated with the hubs 53 and 54 and normally extends past the open front of the case where it cooperates with a transducer. In accordance with the present invention, however, the tape is withdrawn from the cartridge to form a pair of loops 61 and 62 which extend along and are supported by the side walls of the chambers 16 and 17. The tape loops 61 and 62 have low inertia and may be rapidly accelerated and decelerated. The tape can be independently moved past the transducer by the capstan 28 which engages that portion extending between the loops while the reels 53 and 54 may remain stationary or are coming up to speed to supply and take up tape as the tape is moved in either direction by the drive capstan.

A pair of guides 63 and 64 are carried by the base plate 11 and top plate 14 and are adapted to extend into the cartridge to engage either side of the tape and guide the tape as it is withdrawn from the cartridge and supplied to the chambers 16 and 17 as will be presently described.

In order to control the length of the tape loops, photocells 66 and 67 are disposed along the outer walls of the chamber legs 16 and 17. Means are provided for directing light across the legs to the photocell 66 and 67. Such means comprises passages 68 and 69 which direct light from source 71 towards the photocells. As the loops increase and decrease in length, the tape blocks more or less of the passages 68 and 69 to intercept more or less light to thereby change the amount of light impinging upon the photocells. The output from the photocells is indicative of the position of the loops.

The photocells are connected to the control system, to be presently described, which serves to control the motors 48 and 49 to thereby maintain the end of each loop at a predetermined position along the photocell. As the tape length increases or decreases, the respective motor is controlled to supply or take up tape to maintain the tape loop. Thus, as the capstan intermittently drives the tape, the photocell sensing system drives the motors to supply and take up tape.

Figure 4:
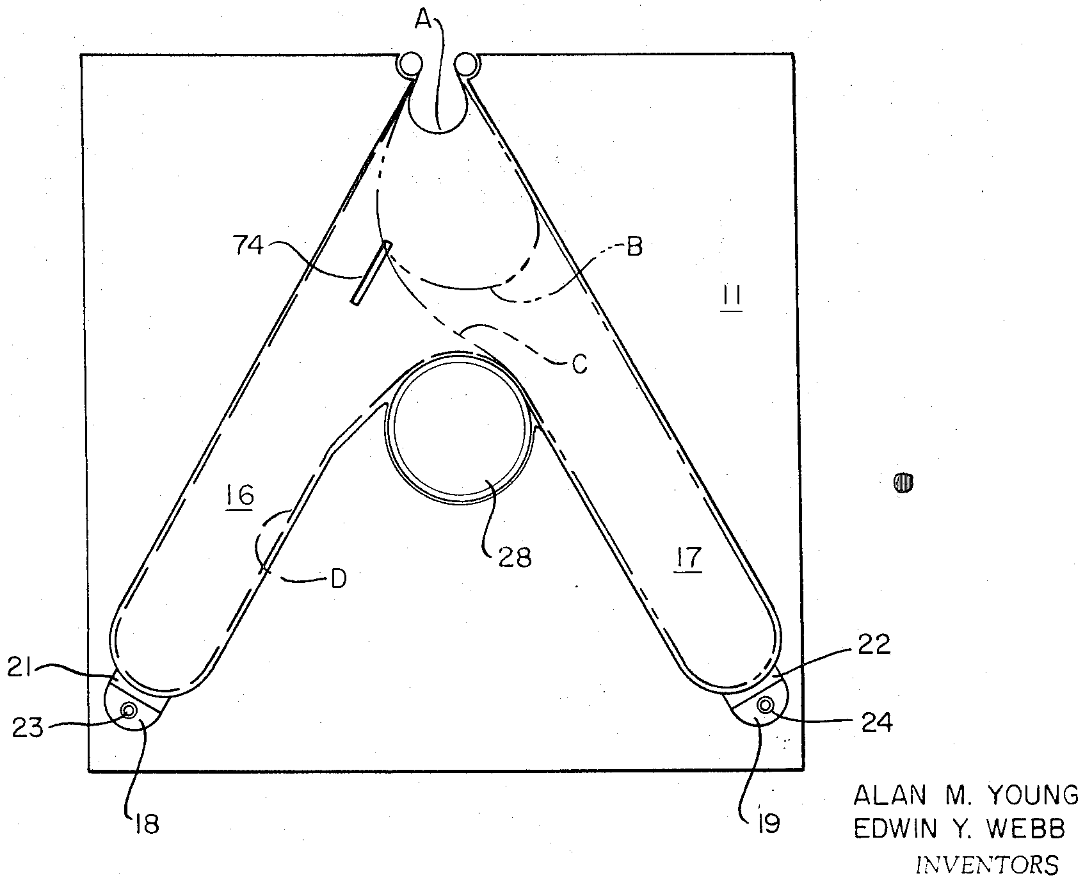
FIG. 4 shows the progressive positions of the tape as it is extended from the cassette into the storage bins during a loading operation.

To load tape into the apparatus, the vacuum system is energized and the cartridge inserted. As the cartridge is inserted the tape engages spaced rotors 72 and 73 mounted at the front of the storage chamber thereby forming a seal which closes the chamber. As the chamber is closed, the vacuum draws the tape from the cartridge into the bin. Referring to FIG. 4, the tape initially is drawn to position A, then continues to extend into the chamber as tape is supplied from the supply reel. As the length of tape is increased to position B, a portion of the tape overlies slot 74 thereby providing a leak for the vacuum in the leg 16. The tape then moves into the chamber 17 until it engages the bottom thereby closing off the corresponding slots 22. The vacuum in the chamber 16 being the only vacuum applied draws the loop down into chamber 16. The photoelectric means are now placed in circuit and serve to take over control of the tape reel motors whereby to maintain the tape loops.

Figure 9:
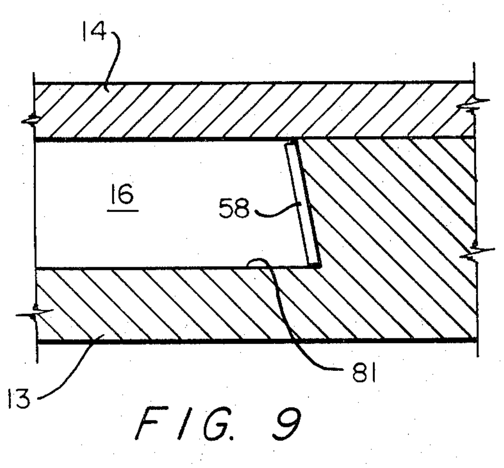
FIG. 9 is an enlarged sectional view taken along the line 9—9 showing the side wall of the storage bin.

Preferably, in accordance with another feature of the present invention, the side walls of the tape bin are inclined outwardly towards the bottom whereby the tape is slightly inclined, FIG. 9. It is seen that with tension on the tape, the tape will be forced downwardly to engage the bottom 81. This serves to accurately position the tape as it is drawn past the magnetic transducer. The tension in the tape is, of course, provided by the vacuum. The pressure of the tape on the capstan is supplied by this tension.

The apparatus includes an air circulating system which minimizes the amount of foreign particles which find their way into the chambers 16 and 17. The inlet to the vacuum pump includes a bypass into which air can be introduced. The bypass includes a valve V. Thus, more air appears at the outlet than is withdrawn from the vacuum chambers. The outlet air is filtered by filter F and introduced into the cartridge adjacent the point of withdrawal of the tape by passage 80. Thus, dust and other particles are moved away from the opening which leads into the vacuum chamber or bin.

It should be apparent that even though a vacuum system has been described for providing differential pressure on the two sides of the tape, such differential pressure can be obtained employing differential positive pressure. Furthermore, vacuum as herein used is intended to mean reduced pressure and not a vacuum as understood in the vacuum art.

Figure 5:
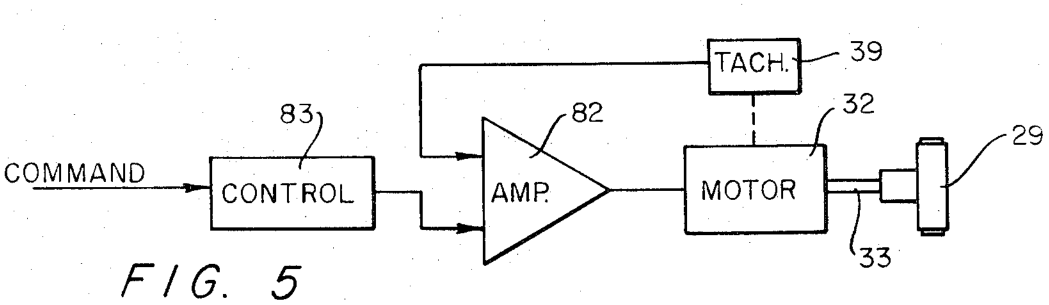
FIG. 5 is a schematic circuit diagram of the capstan control circuit.

The capstan control is shown in FIG. 5. The control comprises a servo system including capstan motor 32 and tachometer 39 which generates and applies a signal which is proportional to speed to amplifier 82. Control means 83 is responsive to a command signal for applying a voltage to the amplifier 82.

Figure 6:
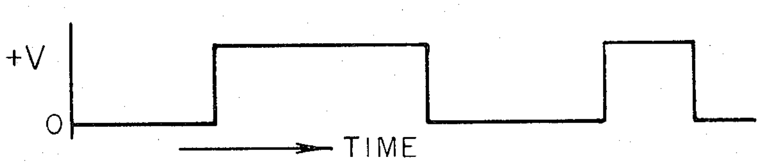
FIG. 6 shows a typical command voltage applied to the control of FIG. 5.
Figure 7:
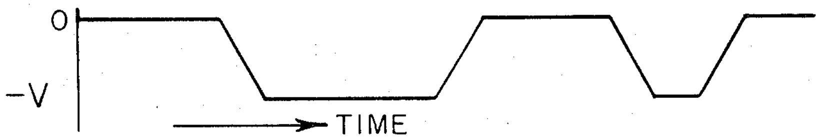
FIG. 7 shows the tachometer voltage generated by the tachometer associated with the tape drive.

Referring, for example, to FIG. 6, the command signal may comprise a signal of the type shown. This signal is applied to the amplifier 82 and serves to accelerate the motor until the feedback voltage from the tachometer 39 is equal to the input voltage, at which time the capstan motor continues to operate at a constant speed until the command signal is removed. The motor and capstan then decelerate and stop. The tachometer output is shown in FIG. 7.

Figure 8:
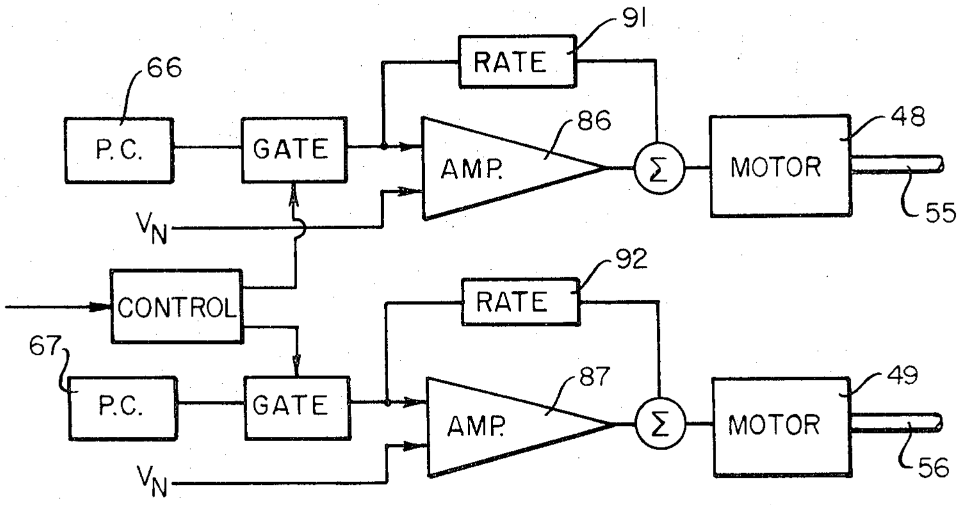
FIG. 8 is a schematic circuit diagram of the reel drives associated with each of the reels.

Referring to FIG. 8, the controls for the reel motors 48 and 49 are schematically illustrated. Here again, there is provided a servo system. An input voltage is applied to amplifiers 86 and 87. This voltage is selected to correspond to the voltage applied from the photocells when the tape is in the desired position. Thereafter, as the tape is moved, the photocell voltage either increases or decreases thereby providing an output voltage from the amplifiers 86 and 87 which drive the associated motor 48 and 49 until the input voltages are again equal. Rate feedback signals are provided by differentiating circuits 91 and 92 and serve to stabilize the motor drive.

During insertion of the cartridge, cassette or reels and also during movement of the tape into the chamber or bin, gate means are provided to gate out the photocell signal and provide an input signal responsive to a control signal. Thus, as the cartridge is inserted, the control signal will apply a voltage to the supply reel thereby rotating the supply reel to supply the tape required to fill the vacuum chambers. Thereafter, the gate on each side admits the photocell signal and gates out the control signal to thereby permit the apparatus to operate in its normal mode of operation. A gate control signal may be generated by a vacuum switch which senses bottoming of the tape in either or both chambers.

Figure 10:
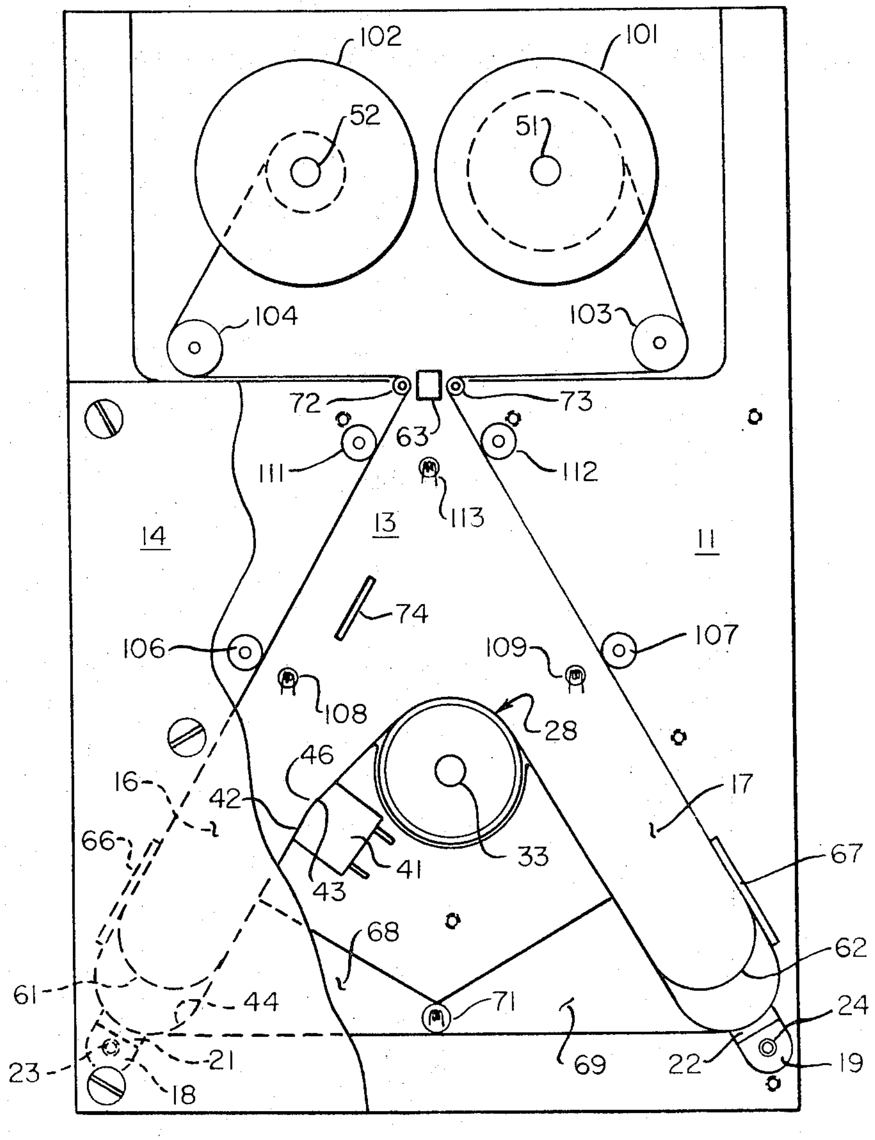
FIG. 10 is a plan view of a tape apparatus with the tape extending between two tape reels.

As explained above, the tape apparatus of the present invention can be used with tape extending between a pair of reels individually mounted on the apparatus rather than between reels mounted in a cartridge or cassette. Referring to FIG. 10, a pair of reels 101 and 102 are shown mounted on hubs 51 and 52. The tape extends over guide rollers 103 and 104 past the rollers 72 and 73. It is drawn into the chamber or bin in the manner previously described.

Figure 11:
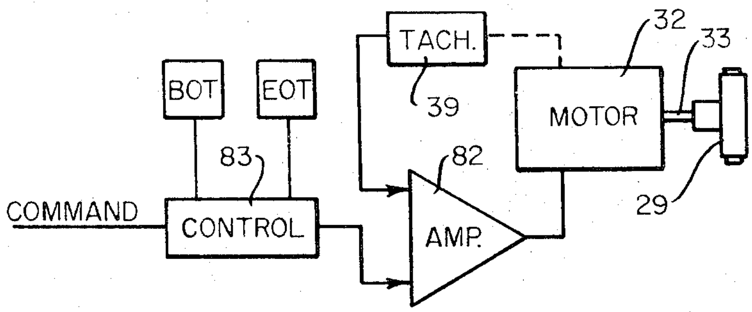
FIG. 11 is a schematic diagram of the capstan control including end of tape and beginning of tape input commands.

In most apparatus the tape includes a clear or transparent leader at each end. If this clear portion should extend into the area of the photocells 66 and 67, it might cause instability. To overcome this possibility, the apparatus may also include means for sensing the beginning and end of tape and inhibiting the drive capstan so that it does not drive the tape further in the same direction, that is, it stops forward drive when end of tape is sensed and reverse drive when the beginning of tape is sensed. Referring to FIG. 10, the means comprises end of tape photocell 106 and beginning of tape photocell 107 which are illuminated by light source 108 and 109, respectively. When the clear leader is over the photocell, it provides a control signal. The end of tape (EOT) and beginning of tape (BOT) controls are shown connected to the capstan control 83 in FIG. 11. In certain applications, it is desirable to provide a warning to associated apparatus when the beginning or end of tape is approaching the transducer. Additional photocells 111 and 112 are disposed near the input to the bin and are illuminated by the lamp 113. These photocells provide a beginning and end of tape warning.

Thus, there has been described a cassette tape apparatus in which the tape is withdrawn from the cassette to provide a tape loop on either side of the capstan, drive means to permit rapid acceleration and deceleration of the tape while permitting slow acceleration and deceleration of the cassette take-up and supply reels whereby to provide a high speed digital information storage and retrieval from the tape.

We claim:

1. Tape apparatus for moving and operating a tape extending between first and second tape reels, said apparatus including a single tape bin having an opening adapted to receive a portion of the tape extending between the reels and first and second branches adapted to receive the tape within the bin and form first and second tape loops, means providing a differential pressure to said tape to maintain the loops and provide tension in the tape extending between the same, a drive capstan disposed entirely within said bin between said first and second branches to engage the tape extending between the branches whereby rotation of said capstan moves the tape, and a transducer cooperating with the tape.

2. Apparatus as in claim 1 wherein there are provided first and second drive means engaging the first and second reels, tape position sensing means at the end of said branches and adapted to sense the position of the tape loop in each branch and generate control signals, means responsive to one of said sensing means for controlling operation of one of said drive means, and means associated with the other of said sensing means for controlling the other drive means whereby the signals developed serve to independently drive the reels to maintain substantially constant tape loops in each of said branches as the tape is intermittently moved past the transducer by the capstan.

3. Apparatus as in claim 1 including end of tape sensing means adapted to provide an output signal when the beginning and end of tape travels into said bin, and means responsive to said signal for stopping the capstan.

4. Tape apparatus for moving and operating on tape contained in tape cartridges of the tape including at least one front opening, a tape cartridge receiving means, at least one tape storage bin including a side wall adapted to receive and support tape extending from said cartridge, a transducer disposed along said wall to cooperate with the tape, a capstan for moving the tape past the transducer, spaced means at one end of the bin adapted to abut the tape in said cartridge when the cartridge is mounted in said apparatus, means at the other end of said bin to reduce the pressure in said storage bin relative to that in the cartridge whereby to apply differential pressure to the tape so that the tape is withdrawn from the cartridge into said bin to engage the sides of the bin and said capstan and transducer, and means for maintaining the tension on the tape to maintain the tape in engagement with said transducer.

5. Tape apparatus as in claim 4 wherein said apparatus includes guide means extending into said cartridge and serving to guide said tape into said bin as it is withdrawn from the cartridge.

6. Apparatus as in claim 4 including sensing means for sensing the position of the tape in said bin and serving to develop a control signal, and means responsive to said control signal for controlling the length of tape in said bin as it is moved by the capstan.

7. Apparatus as in claim 6 including means for sensing the beginning and end of tape and controlling said capstan to arrest further movement of the tape when the beginning and end of tape is sensed.

8. Tape apparatus for moving and operating on tape contained in a cartridge of the type having supply and take-up reels and at least one front opening, at least one tape storage bin adapted to receive the tape extending from the front opening of said cartridge, said storage bin including a side wall adapted to receive and support a portion of said tape, said apparatus including a transducer disposed along said side wall to engage and operate on said tape, a capstan means forming a continuation of said side wall for moving the tape extending between said supply and said take-up reel past the transducer, means for withdrawing a portion of the tape from said cartridge through said opening into said bin to form a loop, individual drive means for the supply and take-up reel, and means in said storage bin for sensing the position of the tape and controlling said supply and take-up reel drive means whereby to maintain a substantially constant length of tape in said bin as the capstan moves the tape.

9. Tape apparatus for moving and operating on tape in cartridges of the type having first and second reels with the tape extending from one reel to the other, said apparatus including cartridge receiving means, a storage bin having an open end adapted to cooperate with said cartridge and spaced branches adapted to receive the tape extending from said cartridge into said bin, means cooperating with said bin to form first and second spaced tape loops in said branches, said bin having side walls adapted to receive and support the tape, a transducer disposed in the portion of said bin wall between said loops, and a capstan disposed within said bin between the loops and forming a portion of the storage bin wall to engage the tape and drive the tape past the transducer.

10. Apparatus as in claim 9 wherein there are provided first and second drive means engaging the first and second reels, tape position sensing means at the end of said branches and adapted to sense the position of the tape loop in each branch and generate control signals, means responsive to one of said sensing means for controlling operation of one of said drive means, and means associated with the other of said sensing means for controlling the other drive means whereby the signals developed serve to independently drive the reels to maintain substantially constant tape loops in each of said branches as the tape is intermittently moved past the transducer by the capstan.

11. Apparatus as in claim 9 wherein said sensing means comprise a light source adapted to project light on one side of each of said branches, and photoelectric means disposed on the other side of said branch serving to receive light from the source to develop an electrical signal proportional to the amount of light which is a function of the position of the tape relative to said photoelectric means.

12. Apparatus as in claim 11 in which said one wall is inclined to urge one edge of the tape against the bottom of the storage bin.

13. Apparatus as in claim 10 including end of tape sensing means adapted to provide an output signal when the beginning and end of tape travels into said bin, and means responsive to said signal for stopping the capstan.

14. Apparatus as in claim 1 including a light source adapted to project light from one side of each of said branches, photoelectric means disposed on the other side of each of said branches serving to receive the light and each photoelectric means developing an electrical signal proportional to the amount of light impinging thereon, said tape loops serving to intercept more or less of the light depending upon their length, drive means for driving said first and second tape reels and means responsive to said electrical signal for selectively controlling said drive means to independently drive the reels to maintain substantially constant tape loop length in each of said branches as the tape is intermittently moved past the transducer by the capstan.

15. Apparatus as in claim 1 wherein means are provided at one of said branches for reducing the differential pressure applied to said tape at one of said branches during loading whereby the tape initially loads into the other branch.

16. Apparatus as in claim 9 in which said bin includes spaced means at one end of the same adapted to abut the tape in a cartridge disposed in said cartridge receiving means whereby said means cooperating with said bin to form first and second spaced loops in the branches serves to initially withdraw the tape from the cartridge into the bin.

17. A tape apparatus as in claim 16 wherein said apparatus includes guide means adapted to extend into said cartridge and guide the edges of the tape so that it is guided into the bin as it is withdrawn from the cartridge.

18. Apparatus as in claim 9 wherein means are provided at one of said branches serving to reduce the differential pressure applied to the tape at said branch during loading whereby the tape is first loaded into the other branch.

19. A tape apparatus for moving and operating on tape disposed in tape cartridges, said tape apparatus including a tape cartridge receiving means, a tape bin having a single opening adapted to cooperate with the tape in the cartridge and receive a portion of the tape extending from said cartridge, said bin including first and second branches adapted to receive the tape extending into the bin to form first and second tape loops in said branches, means providing a differential pressure to said tape to maintain the loops and provide tension in the tape extending between the same, a drive capstan disposed entirely in said bin between said first and second loops to be engaged by the tape extending between the loops whereby rotation of said capstan moves the tape, and a transducer cooperating with the tape between the loops.

* * * * *